United States Patent [19]

Terashita

[11] Patent Number: 5,081,485
[45] Date of Patent: Jan. 14, 1992

[54] METHOD FOR DETERMINING EXPOSURE AMOUNT IN IMAGE COPYING APPARATUS

[75] Inventor: Takaaki Terashita, Kanagawa, Japan

[73] Assignee: Fuji Photo Film Co., Ltd., Kanagawa, Japan

[21] Appl. No.: 550,778

[22] Filed: Jul. 10, 1990

[30] Foreign Application Priority Data

Jul. 14, 1989 [JP] Japan .................................. 1-182114
Jul. 14, 1989 [JP] Japan .................................. 1-182115
Jul. 20, 1989 [JP] Japan .................................. 1-188409

[51] Int. Cl.$^5$ ...................... G03B 27/72; G03B 27/80
[52] U.S. Cl. .................................... 355/38; 355/68; 355/77
[58] Field of Search .............................. 355/38, 77, 68

[56] References Cited

U.S. PATENT DOCUMENTS

| | | | |
|---|---|---|---|
| 4,101,216 | 7/1978 | Grossmann | 355/38 X |
| 4,101,217 | 7/1978 | Fergg et al. | 355/38 |
| 4,274,732 | 6/1981 | Thurm et al. | 355/38 |
| 4,279,502 | 7/1981 | Thurm et al. | 355/38 |
| 4,561,768 | 12/1985 | Fürsich et al. | 355/38 |
| 4,589,766 | 5/1986 | Fürsich et al. | 355/38 |
| 4,627,719 | 12/1986 | Nitsch et al. | 355/41 |
| 4,942,424 | 7/1990 | Terashita et al. | 355/38 |

FOREIGN PATENT DOCUMENTS

293448 4/1990 Japan .

Primary Examiner—L. T. Hix
Assistant Examiner—D. Rutledge
Attorney, Agent, or Firm—Sughrue, Mion, Zinn Macpeak & Seas

[57] ABSTRACT

A method for determining exposure amount by making use of the fact that values in which the photometric data on a lowest-density portion of a color film is subtracted from tricolor photometric data are approximately the same irrespective of the type of film. The lowest-density data is subtracted from the tricolor photometric data to determine tricolor corrected data. This tricolor corrected data is normalized, and the tricolor normalized data is compared with a reference value so as to be classified into tricolor normalized data. The tricolor photometric data is selected in correspondence with this classification, and the exposure amount is determined on the basis of an average value of the tricolor photometric data selected. As a result, it is possible to print various types of film under the conditions of print exposure of a reference film type without requiring information indicating the film type.

18 Claims, 9 Drawing Sheets

METHOD FOR DETERMINING EXPOSURE AMOUNT IN IMAGE COPYING APPARATUS

BACKGROUND OF THE INVENTION

The present invention relates to a method for determining exposure amount in an image copying apparatus, and more particularly to a method for determining exposure amount in an automatic photographic printing apparatus (automatic printer) for printing an image on a color print paper from a photographic color film or the like. Description of the Related Art:

A color negative film as a whole allows three colors of light, blue (B), green (G), and red (R), to be transmitted therethrough, and it is empirically known that the ratios of transmittance of the three color components are, in general, substantially equal or at a fixed rate. For this reason, in an automatic printer an amount of light for printing (i.e., exposure amount) is determined on the basis of the following formula:

$$\log F_j = K_j + D_j \qquad (1)$$

where logF is a logarithm of an amount of light for printing, K is a constant, D is a large area transmittance density (LATD) of the negative measured by a photometric system; and j is the light of any one of the colors B, G and R.

However, if the quantity of light for printing is controlled in an automatic printer on the basis of the aforementioned Formula (1), the overall density of a print from an underexposed negative becomes high in comparison with a print from an adequately exposed negative, while the density of a print from an overexposed tricolor normalized data becomes low. For this reason, exposure amount is determined by providing a slope control circuit so as to correct Dj in Formula (1). Meanwhile, in an automatic printer provided with the slope control circuit, as described above, a faulty print in which the color balance is inappropriate is liable to occur in the case of negatives which have undergone a substantial change over time, negatives photographed with a light source (fluorescent lamp, tungsten lamp, or the like) substantially different from daylight (negatives using a different type of light source), negatives in which color failures have occurred, and other similar negatives. In addition, with a type of film whose manufacturer or sensitivity differs (film of a different type), the sensitivity and density of the three photosensitive layers differ, and favorable prints cannot be made under the same printing conditions. For this reason, Dj in Formula (1) is corrected (color corrected), and in the case of films of a different type, the value of the slope control circuit is altered so as to determine exposure amount. At this time, with respect to a normal correction, an overcorrection is referred to as a high correction, and an undercorrection is referred to as a lowered correction. In the case of the high correction, a color failure occurs, and in the case of the lowered correction, the accuracy of R, G, and B deteriorates.

In recent years, however, high-sensitivity films, films of different usages, novel films with various improvements made have been put on the market every year by various manufacturers, so that the number of film types has increased remarkably and presently several dozens in number. However, since the conditions of print exposure of the various types of film are not necessarily the same, it is necessary to determine the conditions of print exposure for each film type. The operation of determining the conditions of print exposure is generally carried out on a trial-and-error basis and requires trained skill and much time. Therefore, the following techniques have been proposed for automatically determining appropriate conditions of print exposure for each film type on the basis of one set of reference conditions of print exposure.

Japanese Patent Publication No. 15492/1981 discloses a technique in which by making a comparison between predetermined fixed values and color density ratios, B/G, G/R, and R/B, of photometric values at respective points of an image, an examination is made as to whether or not a photometric value of one of the three primary colors is greater than those of the others, and the larger photometric values are not used in determining exposure amount. In addition, Japanese Patent Laid-Open No. 94927/1976 discloses a technique in which the exposure amount is determined on the basis of a photometric value excluding a photometric value which is offset by a predetermined amount from a reference value inherent in a standard image of each film type. These techniques have a drawback in that since it is necessary to provide comparative values or reference values peculiar to the types of film, it is necessary to input data indicating the film type and prepare and store comparative values or reference values for each film type.

To overcome this drawback, Japanese Patent Laid-Open No. 93448/1990 discloses a technique in which a multiplicity of image densities are stored in advance for the respective types of film in correspondence with codes each indicating the film type recorded on the film, and a reference value is determined in advance for each film type on the basis of the stored data, a type of film to be printed being determined by reading the code, thereby determining exposure amount for the film to be printed on the basis of a photometric value of the film to be printed and determined by selection with respect to the reference value and on the basis of a reference condition of print exposure. According to this method, although it is possible to automatically determine a reference value, there is a drawback in that the method cannot be applied to those types of film that are not provided with information such as a code indicating a film type (for instance, in the case of 110 film, Brownie film, and disk films).

As a method for determining print exposure without using information on the film type, a method is known (Japanese Patent Laid-Open No. 46741/1980) in which each time an original film is copied, a photometric value is selected by using a curve indicating a color balance characteristic determined on the basis of photometric values, so as to determine an exposure amount. However, since the color balance characteristic curve is determined on the basis of a test exposure portion burned in the film, this method is very difficult to adopt in practical applications.

In the technique disclosed in Japanese Patent Laid-Open No. 110829/1979, exposure amount is determined on the basis of a multiplicity of photometric values of one film image, and it is necessary that the photometry of one film be completed prior to printing. For this reason, in an apparatus in which a photometric portion and a printing portion are separated from each other as in the technique disclosed in Japanese Patent Laid-Open No. 220761/1984, or in an apparatus in which a photometric portion and a printing portion are provided in the same location as in the technique disclosed in Japanese Patent Laid-Open No. 1648/1986, the film which has been conveyed for both photometry and printing needs to be conveyed in a reverse direction, so that a high-speed operation becomes difficult. In addition, there is another drawback in that since the frequency of conveying the film increases, the film is liable to become damaged.

In addition, Japanese Patent Laid-Open No. 220760/1984 discloses the following technique. A point of the lowest density, including a mask density, is first determined in an original picture, or its vicinity, of a film strip. With an increase in the neutral density at a measuring point with respect to the aforementioned point of the lowest density, a threshold value of chromaticity at that measuring point is increased. Then, a comparison is made between the aforementioned threshold value and a value for the lowest density among measured values obtained by scanning the copied original picture with respect to the three primary colors, thereby selecting a photometric spot which does not exceed the aforementioned threshold value. This technique is based on the fact that the lowest density at a measuring point on an original picture or its vicinity (or the film strip to which the original picture belongs) is close to the mask density, and therefore the chromaticity at individual measuring points is not large.

With this method, however, the following drawback is encountered. That is, from the mask density it is impossible to ascertain the film characteristics (tricolor sensitivity balance, tricolor gradation balance, the linearity of the characteristic curve, etc.). For that reason, a method is provided for determining a threshold of a measuring point with respect to the point of the lowest density, but this method is inadequate in coping with the effect accruing from such as a change in the film type or the negative development performance, a difference between photometers, and so on. Therefore, the above-described color balance characteristic curve is determined with respect to a selected value of the photometric spot (photometric value). For that reason, however, the drawback described in connection with Japanese Patent Laid-Open No. 110829/1979 remains unresolved.

Meanwhile, in order to effect printing in such a manner that the quality of color prints is always excellent in an automatic printer, it is necessary to accurately set the conditions of exposure in the automatic printer. Therefore, standard conditions of exposure are set at the time of installation of the automatic printer. However, it is necessary to reset the conditions of exposure by correcting the same in cases such as where a color paper of a different emulsion number is used, a printer lamp is replaced, the developing solution of the developing equipment is replaced, the contents of the photograph have changed from those having colorful hues to those having obscure hues, or vice versa, during a change of season. In correcting the conditions of exposure, by using a condition-setting film, such as a reference negative film in which a portion corresponding to a negative with a yellowish green object photographed thereon is provided around a portion corresponding to a negative with a gray object photographed thereon, or a film with an image of a standard object photographed thereon, a comparison is made between the density of a test print obtained from this condition-setting film on the one hand, and the density of a reference print obtained in advance and serving as a reference on the other.

Since exposure control is effected on the basis of high correction in the method (photometric point selecting system) for determining exposure amount by selecting photometric points as described above, and on the basis of lowered correction in the case of manual printing, in cases where automatic printing and manual printing are carried out in mixed form with an automatic printer of the photometric point selecting system, it is necessary to set two exposure conditions, one for automatic printing and another for manual printing.

With the above-described photometric point selecting system, however, there is a problem in that unless film characteristics (sensitivity of three colors, gradation, and mask density) are stored accurately in memory, exposure conditions are set with part of the photometric values of a condition setting film discarded, making it impossible to set the exposure conditions properly and undermining reproducibility. This problem is particularly liable to occur in over-exposed and underexposed negatives. Furthermore, even in the case of a film with a standard object photographed thereon, the image is composed of a multiplicity of colors, the reproducibility of photometric values is poor, and there are cases where it is impossible to set the exposure conditions properly.

In addition, with the method (photometric point selecting system) for determining exposure amount by selecting photometric points, a condition for selecting photometric points is set on the basis of photometric data. However, a problem exists in that it is impossible to obtain a condition for selecting photometric points with good accuracy since the condition for selecting photometric points is set by including photometric data on a special object (e.g., an object in which color failures are liable to occur, an object photographed with a different type of light source, etc.) and also including photometric data on an object with a biased color balance which is peculiar to a local scene (e.g., a seashore, a snowy mountain, tinted autumnal leaves, a forest, etc.).

SUMMARY OF THE INVENTION

Accordingly, a primary object of the present invention is to provide a method for determining exposure amount in an image copying apparatus which does not require information indicating a type of film at the time when various types of film are printed under the print exposure conditions of a reference film type, and which is capable of effecting high-speed printing processing, thereby overcoming the above-described drawbacks of the conventional art.

In addition, a second object of the present invention is to provide a method for determining exposure amount in an image copying apparatus which is capable of accurately setting exposure conditions at the time when various types of film are printed under the exposure conditions of a reference film type.

Furthermore, a third object of the present invention is to provide a method for determining exposure amount in an image copying apparatus which is capable of setting a condition for selecting photometric points with good accuracy and of effecting high-speed printing processing at the time when various types of film are printed under the print exposure conditions of a reference film type.

To attain the aforementioned objects, in accordance with a first aspect of the invention there is provided a method for determining exposure amount in an image copying apparatus, comprising the steps of: determining tricolor photometric data by dividing a color film with images recorded thereon into a plurality of segments and by photometrically measuring the segments; determining tricolor corrected photometric data by correcting the tricolor photometric data with photometric data on a lowest-density portion of the color film including an image-recorded portion thereof; determining tricolor normalized data by normalizing the tricolor corrected photometric data by transforming the tricolor corrected photometric data in accordance with a predetermined condition of transformation; classifying the tricolor normalized data by comparing the tricolor normalized data with a reference value; selecting the tricolor photometric data in correspondence with the classification of the tricolor normalized data; and determining the exposure amount on the basis of an average value of the tricolor photometric data selected.

In addition, in accordance with a second aspect of the invention there is provided a method for determining exposure amount in an image copying apparatus, comprising the steps of: determining tricolor photometric data by dividing a color film with images recorded thereon into a plurality of segments and by photometrically measuring the segments; determining tricolor corrected photometric data by correcting the tricolor photometric data with photometric data on a lowest-density portion of the color film including an image-recorded portion thereof; determining tricolor normalized data by normalizing the tricolor corrected photometric data by transforming the tricolor corrected photometric data in accordance with a predetermined condition of transformation; classifying the tricolor normalized data by determining to which of a plurality of divided regions on a predetermined coordinate the tricolor normalized data belongs; selecting the tricolor photometric data in correspondence with the classification of the tricolor normalized data and an operational mode of the image copying apparatus; and determining the exposure amount on the basis of an average value of the tricolor photometric data selected and tricolor data corresponding to a specific color on the coordinate.

Furthermore, in accordance with a third aspect of the invention there is provided a method for determining exposure amount in an image copying apparatus, comprising the steps of: determining tricolor photometric data by dividing a color film with images recorded thereon into a plurality of segments and by photometrically measuring the segments; determining tricolor corrected photometric data by correcting the tricolor photometric data with photometric data on a lowest-density portion of the color film including an image-recorded portion thereof; determining tricolor normalized data by normalizing the tricolor corrected photometric data by transforming the tricolor corrected photometric data in accordance with a condition of transformation set by storage data; classifying the tricolor normalized data by determining to which of a plurality of divided regions on a predetermined coordinate the tricolor normalized data belongs; selecting the tricolor photometric data in correspondence with the classification of the tricolor normalized data; and determining the exposure amount on the basis of an average value of the tricolor photometric data selected and storing necessary tricolor photometric data as the stored data.

A description will be given hereinunder of the operation of the present invention. FIG. 2 is an example in which a standard object was photographed by using four types of negative films A, B, C, and D and by consecutively changing the exposure amount, and in which average densities obtained by photometrically measuring the film images are shown on color coordinates with R - G set as the abscissa and G - B as the ordinate. FIG. 3 shows on color coordinates image densities in which the mask densities of the films are subtracted from the average densities shown in FIG. 2. As can be appreciated from FIG. 3, the densities of image portions of the respective films in which the mask densities are subtracted from the average densities are substantially approximate to each other with the exception of a high-density portion of the film C. FIG. 4 shows color coordinates average densities of a multiplicity of images (about 100 frames) with respect to the aforementioned four types of negative films, the average densities being divided into four density levels. An upper end of each broken line indicates each mask density. Three of the four types of film are substantially different. FIG. 5 shows color coordinates densities in which the mask densities are subtracted from the respective average densities as well as average values of the densities of the four films. In this chart, by coincidence the densities of film image portions are substantially approximate to each other in the same manner as FIG. 3.

However, such a coincidence has not been found with negative films produced up until recent years. Combinations of negative films and papers manufactured by only one or a very few number of manufacturers have been prevalent in most cases. It was sufficient if favorable photographic prints could be obtained in those combinations. No sufficient consideration has been given to the other combinations. In recent years, however, as a result of the worldwide diffusion of various types of films, the number of possible combinations of various types of negative films and various types of color papers has reached an enormous scale. In order to ensure that any combination can be used, it is necessary that the characteristics of the gradation balance of various film types be approximate to each other. The results of FIGS. 2 and 4 show that the gradation balance characteristics of the various types of films are approximate to each other.

However, the characteristics of coloring materials used in various films are naturally different, and the light-sensitive material designing techniques are not similar, so that the mask densities are not identical for the respective film types.

FIGS. 6 and 7 illustrate cases in which, instead of the mask densities, photometric data on low-density portions of film image portions are subtracted from average densities and shown on the same color coordinates as those of FIGS. 3 and 5. A better coincidence can be obtained for important density regions with respect to the four types of films than subtracting the mask densities.

Accordingly, average density values of one film in which low-density-portion photometric data including the mask density are subtracted from photometric values may be used as the image-portion characteristic of each type of film. In addition, an average value of a plurality of average density values mentioned above may be used for each type of film.

As described above, irrespective of the type of film, a similarity can be noted for the data in the mask density or a low density close to it, i.e., either lowest-density data, other than an image recorded portion, of a color film, or lowest-density data on the image recorded portion of the color film. For this reason, in the first aspect of the invention, tricolor corrected photometric data is obtained by correcting tricolor photometric data with low-density-portion photometric data by subtracting photometric data on a low-density portion of the color film, including the image recorded portion, from the tricolor photometric data obtained by dividing the color film with an image recorded thereon into a multiplicity of segments and by photometrically measuring the segments. This tricolor corrected photometric data is transformed into tricolor normalized data by being normalized in accordance with a predetermined condition of transformation. This tricolor normalized data is classified by being compared with a reference value, the tricolor photometric data is selected in correspondence with this classification, and exposure amount is determined on the basis of an average value of the tricolor photometric data selected.

As has been described with respect to the mask density, since the mask densities do not coincide with each other, it is preferable to determine the low-density-portion photometric data with respect to each type of color film.

As described above, in accordance with the first aspect of the invention, exposure amount is determined by using tricolor corrected photometric data in which tricolor photometric data obtained by photometrically measuring a color film is corrected with photometric data on a low-density portion of the color film. Since the tricolor corrected photometric data are approximately the same irrespective of the types of film, it is possible to obtain an advantage in that the exposure amount of each type of film can be determined on the basis of the exposure amount of a reference film type without using information on a film type.

In addition, since the photometric data on a low-density portion of a color film can be determined without photometrically measuring one film, it is possible to obtain the advantage or high-speed printing processing.

In accordance with the second aspect of the invention, the tricolor normalized data obtained as described above is classified by determining to which of a plurality of divided regions on predetermined coordinates the tricolor normalized data belongs. The tricolor photometric data is selected in correspondence with this classification and an operational mode of an image copying apparatus, and exposure amount is determined on the basis of an average value of the tricolor photometric data selected and tricolor data corresponding to a specific color on the coordinates. Here, the reason why the tricolor photometric data is selected in correspondence with the operational mode is because it is impossible to distinguish whether the print quality was poor due to an inappropriate selection of photometric data or due to an inappropriate exposure condition when, for instance, the quality of the print was poor in the photometric point selecting system. For this reason, in the second aspect of the invention, an arrangement provided such that the number of items of tricolor photometric data to be selected is altered in correspondence with various operational modes including an exposure condition setting mode, an automatic printing mode, and a manual printing mode. In the exposure condition setting mode, the number of items of the tricolor photometric data selected preferably become more numerous than in the automatic printing mode. As a result, the function of selecting the tricolor photometric data is weakened, and the effect of an inappropriate data selection on the poor print quality can be alleviated, thereby making it possible to set an appropriate exposure condition.

In addition, since the condition setting film (a standard film for condition confirmation) is produced to be used commonly for an automatic printer of a lowered correction system, in order to ensure that the targeted print densities will not differ between the automatic printing mode and the manual printing mode, it is necessary to lower the color correction level below a high-correction level (or a full-correction level). For this reason, in the second aspect of the invention, a weighted average value of the average value of the tricolor photometric data is selected and the tricolor data is calculated by changing the weight in correspondence with an operational mode, and exposure amount is calculated on the basis of the weighted average value.

As described above, in accordance with the second aspect of the invention, the exposure amount is determined by using tricolor corrected photometric data in which the tricolor photometric data obtained by photometrically measuring a color film is corrected with photometric data on a low-density portion of a color film. Since this tricolor corrected photometric data are approximate to each other irrespective of the types of films, it is possible to determine the exposure amount of each type of film under the exposure condition of a reference film type without using information of the film type. In addition, since the number of items of the tricolor photometric data selected are altered in correspondence with an operational mode of an image copying apparatus, advantages can be obtained in that it is possible to accurately set the exposure condition, and the print density does not vary depending on the operational mode.

In addition, in accordance with a third aspect of the invention, the tricolor corrected photometric data obtained as described above is normalized in accordance with a condition of transformation set by stored data obtained by accumulating necessary tricolor photometric data and is thereby transformed into tricolor normalized data. This tricolor normalized data is classified by determining to which of a plurality of divided regions the tricolor normalized data belongs. The tricolor photometric data is selected in correspondence with this classification, and exposure amount is determined on the basis of an average value of the tricolor photometric data selected. In addition, the necessary tricolor photometric data is stored to be used as the stored data.

With the aforementioned necessary tricolor photometric data, it is possible to use the tricolor photometric data selected in correspondence with the classification of the tricolor normalized data. In addition, prior to selecting the tricolor photometric data in correspondence with the classification of the tricolor normalized data, the tricolor corrected photometric data may be normalized and classified after selecting tricolor corrected photometric data in accordance with a predetermined condition of selection, and the selection of the tricolor photometric data may be effected in correspondence with the classification of the tricolor normalized data. This condition of selection may be set on the basis of an allowable value based on the stored data. As a result, the accuracy of selection of tricolor photometric data improves since the tricolor photometric data for storage is selected after the number of items of the photometric data are initially reduced through a rough selection. In addition, the tricolor corrected photometric data is sufficient to be used as a condition setting reference for selecting photometric data with rough accuracy since the tricolor corrected photometric data are approximate to each other irrespective of various film types.

The exposure amount may be determined on the basis of an average value of the tricolor photometric data selected as well as tricolor data corresponding to a specific color (e.g., a neutral color) on the coordinates. This tricolor data may be determined on the basis of the stored data.

As described above, in accordance with the third invention, exposure amount is determined by using the tricolor corrected photometric data in which the tricolor photometric data obtained by photometrically measuring a color film is corrected with photometric data on a low-density portion of the color film. Since the tricolor corrected photometric data are approximate to each other irrespective of the types of films, it is possible to determine exposure amount for various types of films with an exposure amount of a reference film type without using information on the film type. In addition, since the tricolor photometric data for determining exposure amount is selected after the tricolor corrected photometric data is normalized in accordance with a condition of transformation set by stored data, it is possible to obtain an additional advantage in that the selection accuracy improves and exposure amount can be determined accurately.

In addition, since the photometric data on a low-density portion of the color film can be determined without photometrically measuring one entire film, it is possible to obtain the advantage that high-speed printing processing is possible.

DESCRIPTION OF THE PREFERRED EMBODIMENTS

Figure 8:
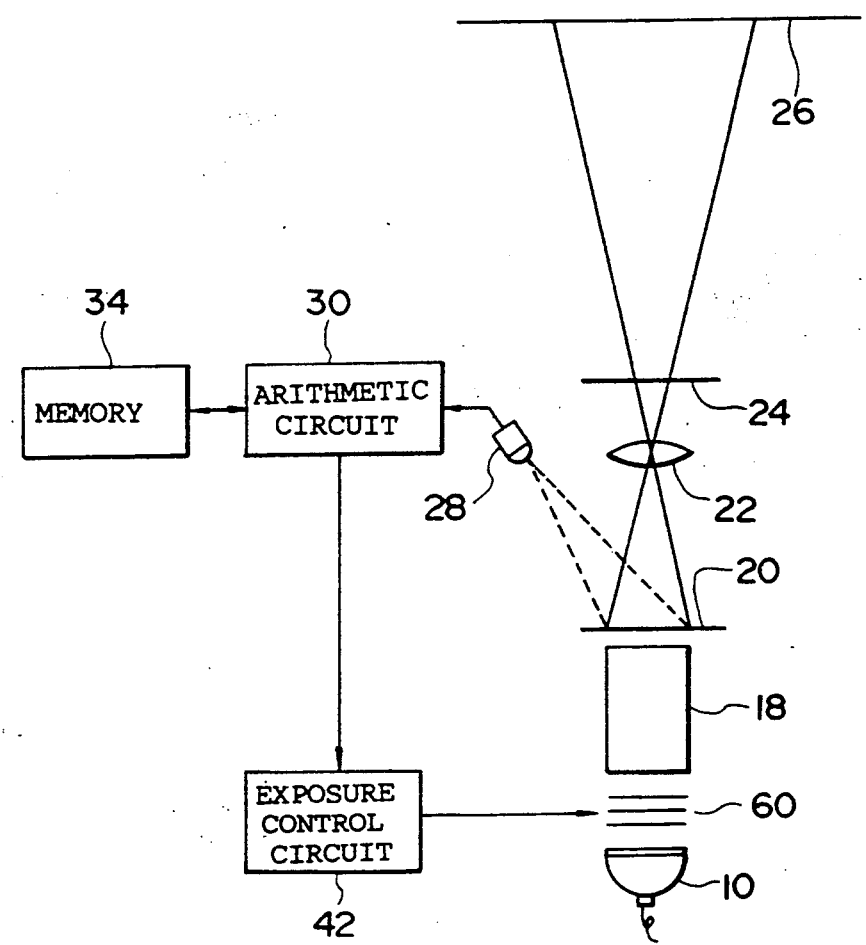
FIG. 8 is a schematic diagram of an automatic color printer to which the present invention is applied.

Referring now to the accompanying drawings, a detailed description will be made of the embodiments of the present invention. FIG. 8 schematically illustrates an automatic color printer to which the present invention can be applied. A mirror box 18 and a lamp house 10 having a halogen lamp are arranged below a color negative film 20 which has been conveyed to a printing section by being loaded on a negative carrier. A light-adjusting filter 60 is interposed between the mirror box 18 and the lamp house 10. The light-adjusting filter 60 comprises three filters, a yellow (Y) filter, a magenta (M) filter, and a cyan (C) filter in a conventional manner.

A lens 22, a black shutter 24, and a color paper 26 are arranged in order above the negative film 20. The arrangement is such that a beam of light which is applied from the lamp house 10 and is transmitted through the light-adjusting filter 60, the mirror box 18, and the negative film 20 forms an image on the color paper 26 by means of the lens 22.

Figure 9:
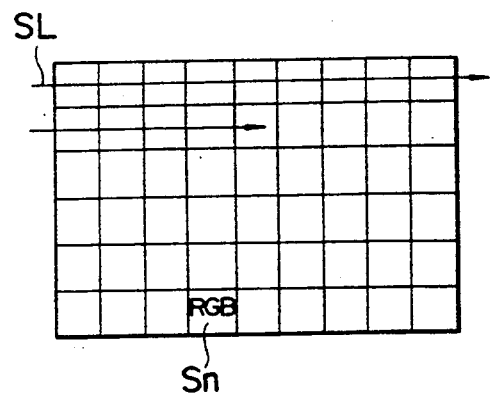
FIG. 9 is a diagram illustrating a state in which photometry is conducted by planarly dividing a film into a plurality of segments.

A photometer 28 is disposed in a direction inclined with respect to an optical axis of the aforementioned image-forming optical system and at a position which the image density of the negative film 20 can be photometrically measured. This photometer 28 is constituted by a two-dimensional image sensor, a line sensor, or the like, and effects photometry with respect to a negative image along scanning lines SL by planarly dividing the negative image into a plurality of pixels Sn, as shown in FIG. 9. In this case, the photometry of each pixel is conducted for the three primaries of B, G and R.

The photometer, 28 is connected to an arithmetic circuit 30 constituted of a microcomputer or the like for calculating a print exposure. Connected to the arithmetic circuit 30 are a memory 34 for storing data as well as an exposure amount controlling circuit 42 for controlling the print exposure by controlling the light-adjusting filter 60 on the basis of the exposure amount calculated by the arithmetic circuit 30.

Figure 1:
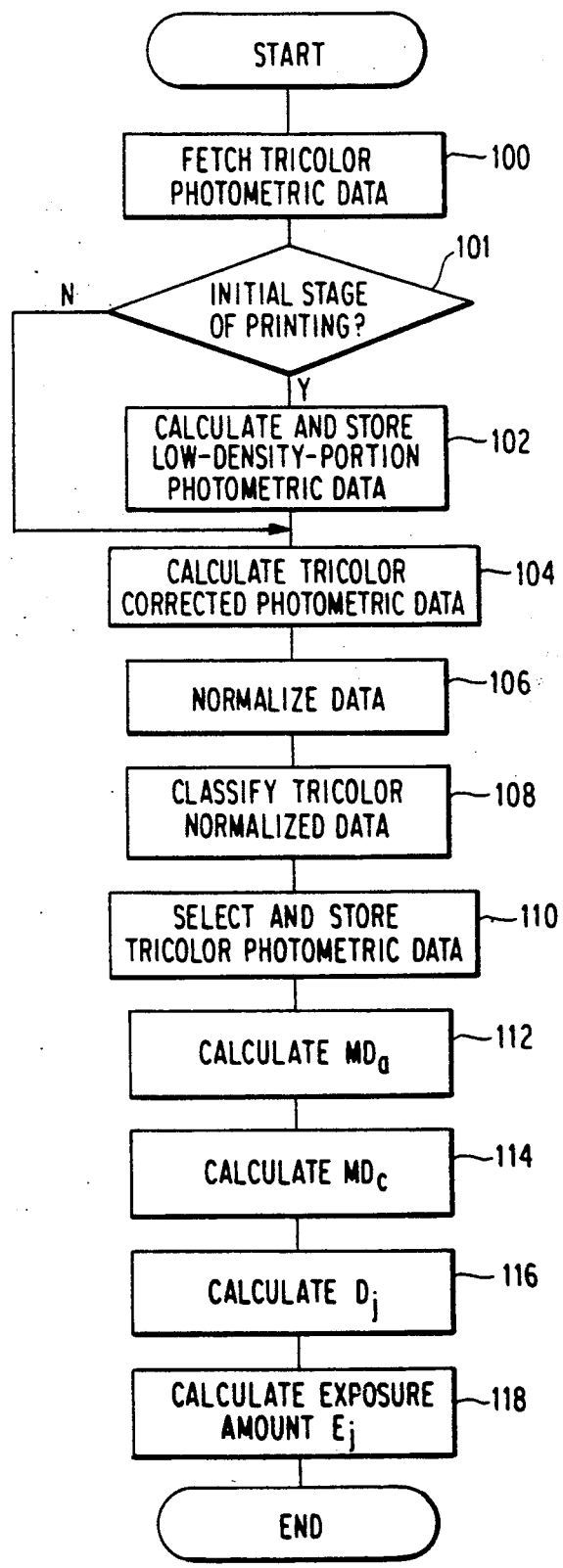
FIG. 1 is a flowchart illustrating a routine for calculating exposure amount in accordance with an embodiment of the present invention.
Figure 2:
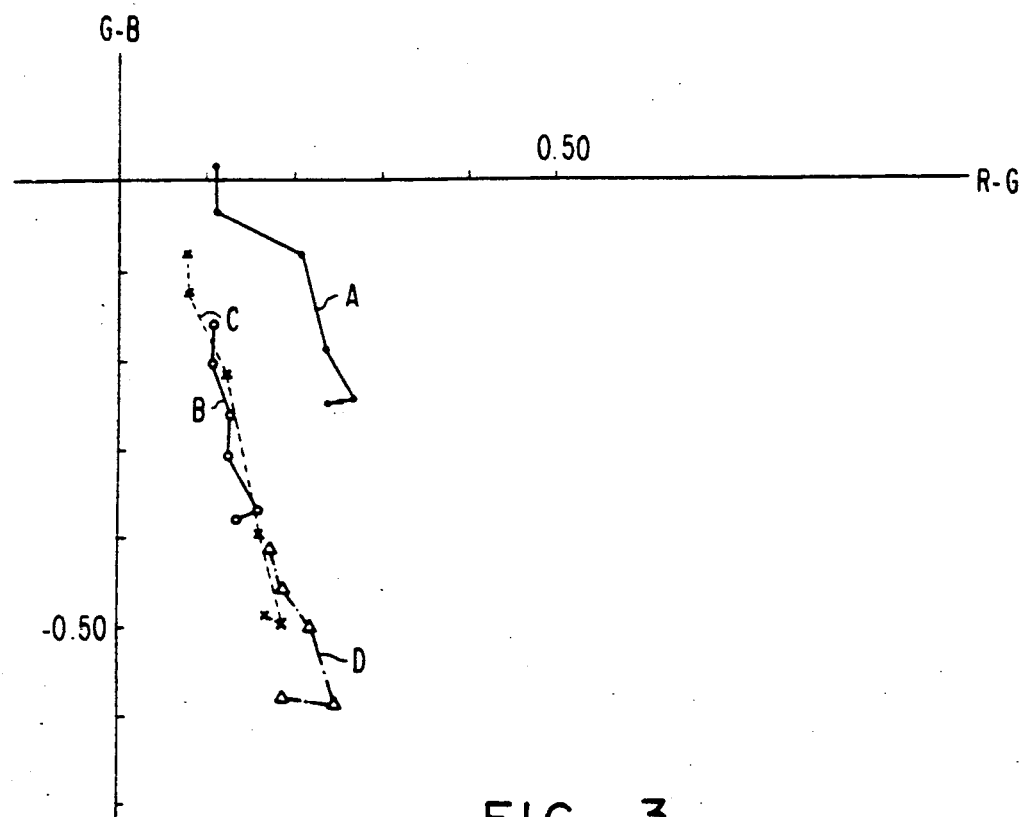
FIG. 2 is a chart showing on color coordinates average densities obtained by photometrically measuring a film image in which a standard object was photographed on four types of negative film, A, B, C, and C, by consecutively changing the exposure amount.
Figure 3:
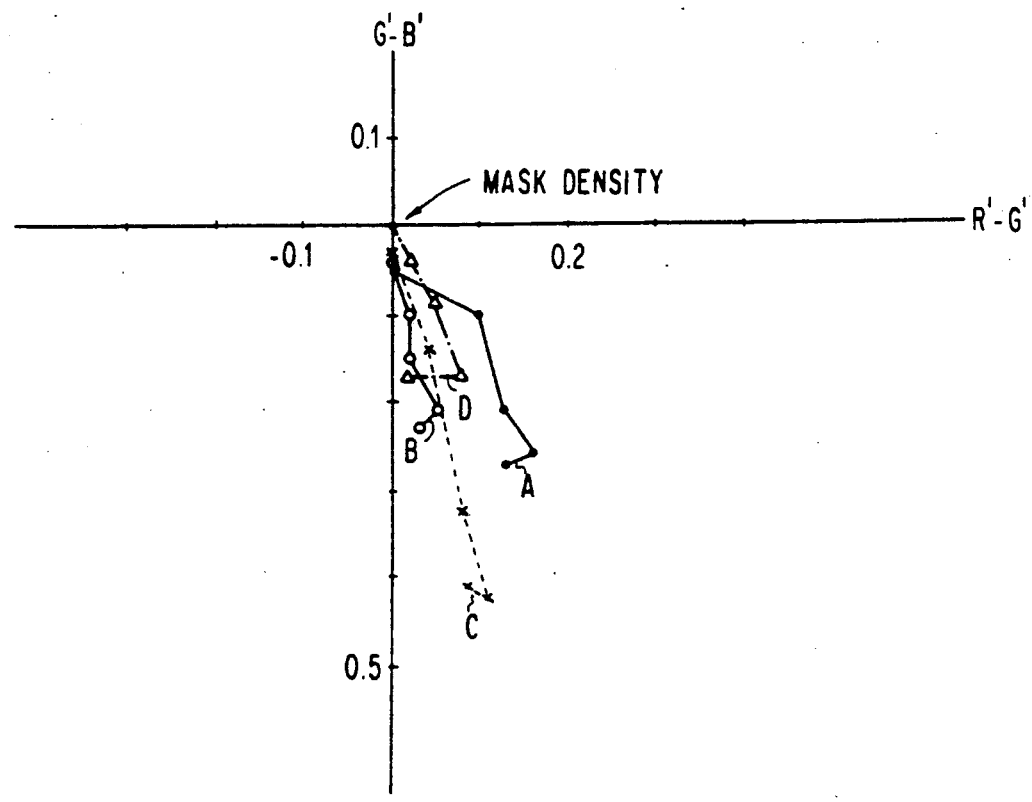
FIG. 3 is a chart showing on color coordinates image densities in which mask densities are subtracted from the average densities shown in FIG. 2.
Figure 4:
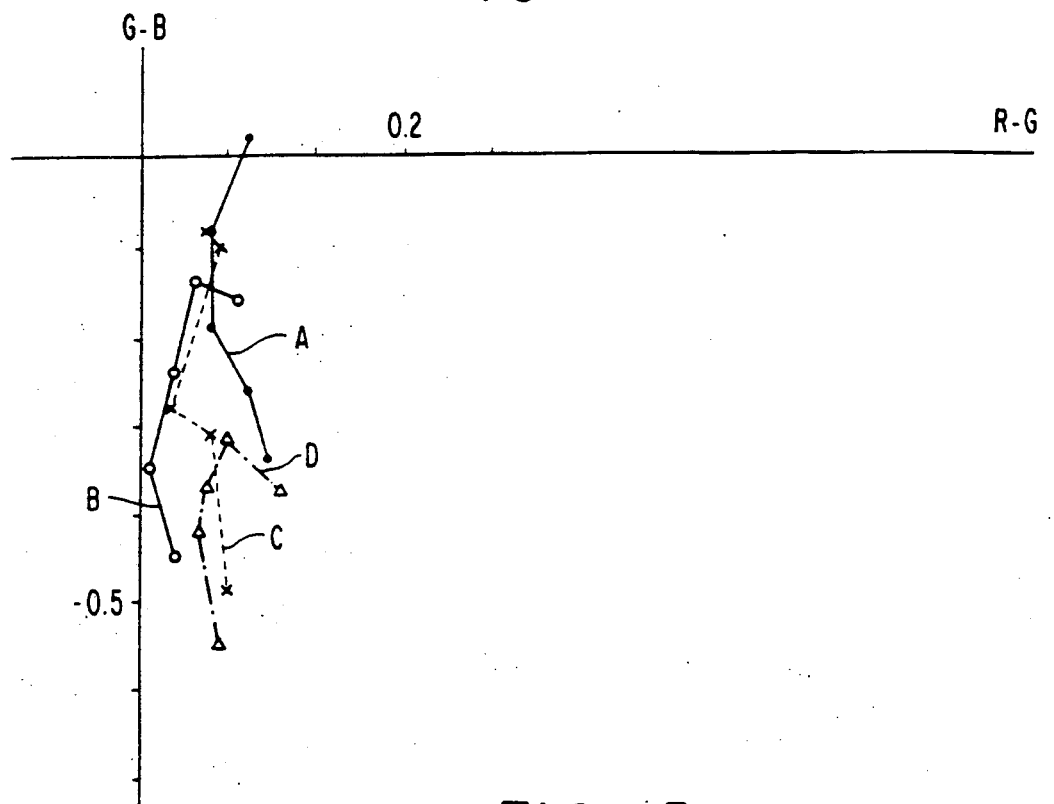
FIG. 4 is a chart in which a multiplicity of average densities are divided into four density levels with respect to the four types of negative film and are shown on color coordinates.
Figure 5:
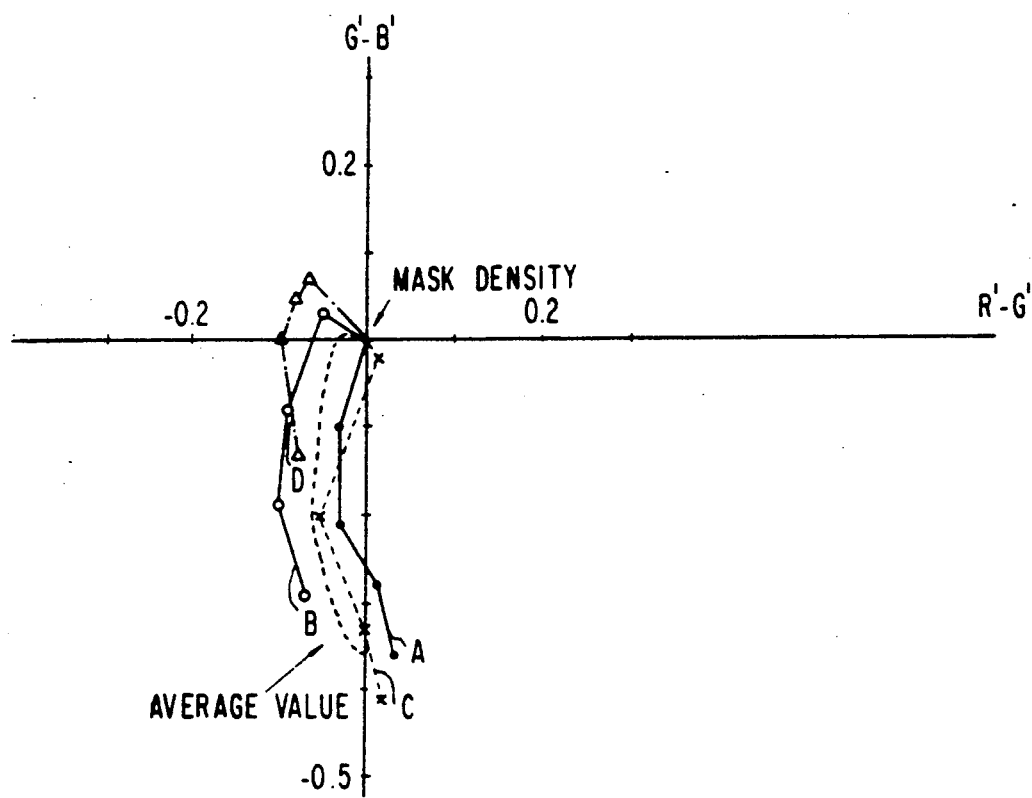
FIG. 5 is a chart showing on color coordinates densities in which the mask densities are subtracted from the average values.
Figure 6:
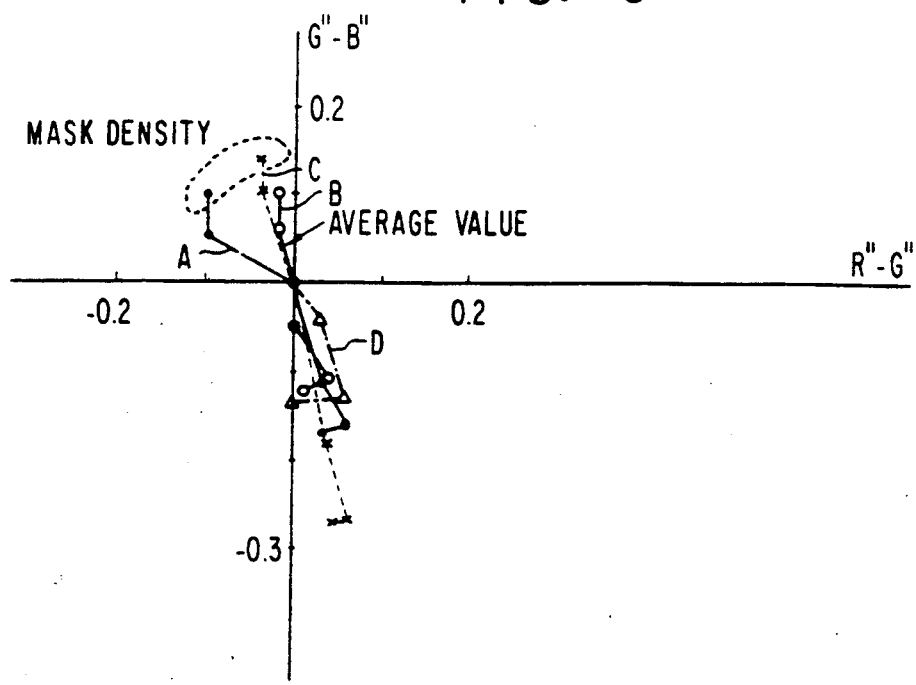
FIGS. 6 and 7 are charts in which values obtained by subtracting photometric data for a low-density portion is subtracted from average values are shown on similar color coordinates to those of FIGS. 3 and 5.
Figure 7:
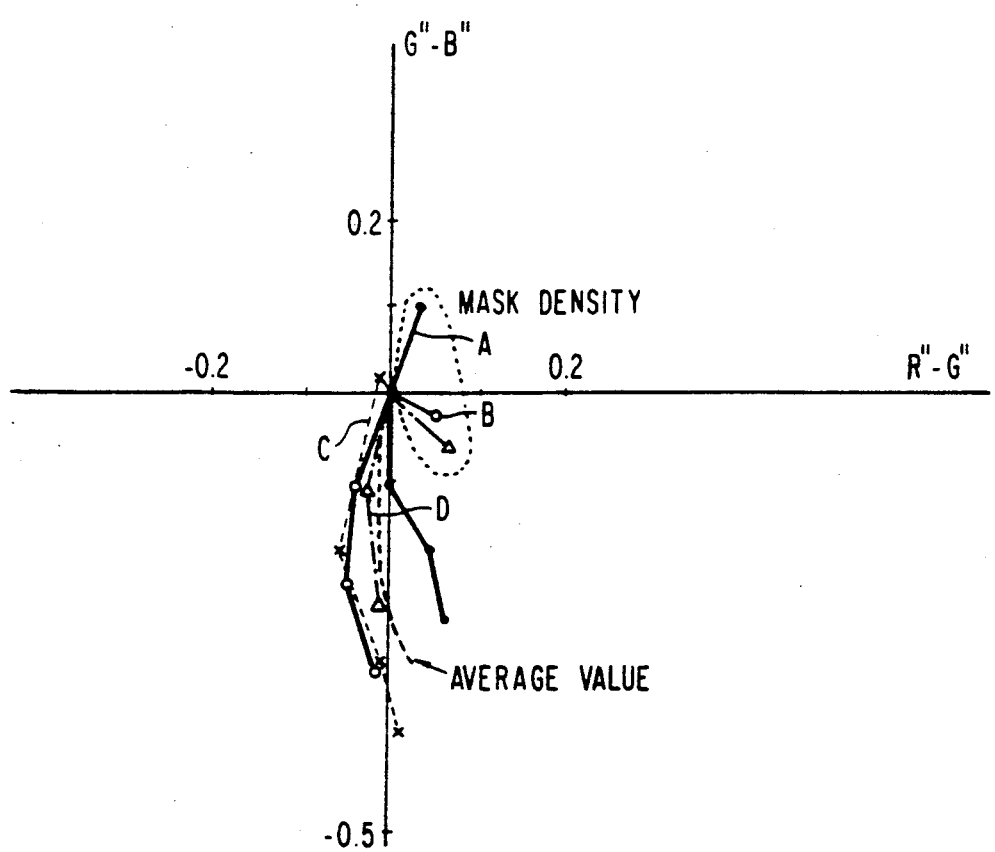

Referring now to FIG. 1, a description will be given of a routine for calculating exposure amount by means of the arithmetic circuit 30. In Step 100, tricolor photometric data photometrically obtained by the photometer 28 is fetched, and a determination is made in Step 101 as to whether or not photometry is to be effected for an initial stage of printing, i.e., whether or not photometry is to be effected for a printing-start image frame or for a number of frames beginning with the printing-start image frame (a maximum of six frames or thereabouts). In the case of photometry for the initial stage of printing, the operation proceeds to Step 102, and if it is not photometry for the initial stage of printing, the operation proceeds to Step 104. In Step 102, by using an average mask density stored in advance in the memory 34, tricolor low-density-portion photometric data MIN (R), MIN (G), and MIN (B) are calculated as described below and are stored in the memory 34. Parenthetically, the average mask density is determined by averaging the mask densities or average lowest densities of various types of film. A comparison is made between a value which is greater by a predetermined value $\alpha$ (e.g., 0–0.6) than the average mask density on the one hand, and the lowest-density value of the tricolor photometric data or an average value of the tricolor photometric data on the other. When (the average mask density $+\alpha$) > (a lowest-density value of the tricolor photometric data or an average value of the tricolor photometric data), the lowest-density value of the tricolor photometric data or an average value of the tricolor photometric data is set as the low-density-portion photometric data. Meanwhile, when (the average mask density $+\alpha$) < (a lowest-density value of the tricolor photometric data or an average value of the tricolor photometric data), the value which is greater by the predetermined value $\alpha$ than the average mask density is set as the low-density-portion photometric data.

Figure 10:
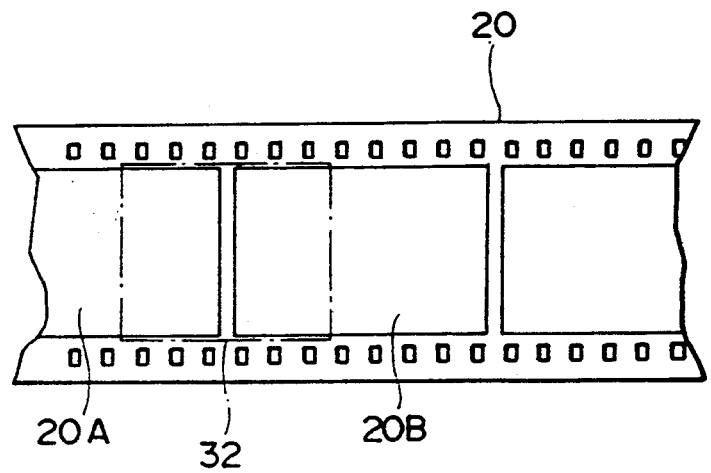
FIG. 10 is a diagram illustrating a state in which a mask density is photometrically measured.

It should be noted that a lowest-density value of the tricolor photometric data obtained with a photometric area 32 of the photometer 28 straddling image frames 20A, 20B may be set as the low-density-portion photometric data as shown in FIG. 10. In addition, the low-density-portion photometric data may be determined for each film type by storing in advance the mask density, i.e., the low-density-portion photometric data, in the memory 34 for each type of film and by detecting a so-called DX code indicating the film type to determine the film type.

Since the low-density-portion photometric data is determined as described above, there are cases where this low-density-portion photometric data is the lowest-density data on an image-recorded portion of the color film and where it is the lowest-density data on a portion other than the image-recorded portion of the color film (i.e., the mask density). Since this lowest-density-portion photometric data is determined by conducting photometry of a printing-start image frame or for a number of frames beginning with the printing-start image frame (a maximum of six frames or thereabouts), it is possible to effect a high-speed operation for printing.

In the ensuing Step 104, tricolor corrected photometric data R, G, B are calculated by subtracting the low-density-portion photometric data MIN (R), MIN (G), MIN (B) from the respective tricolor photometric data. This corrected photometric data show characteristics that closely resemble each other irrespective of the type of film, as described above.

Figure 11:
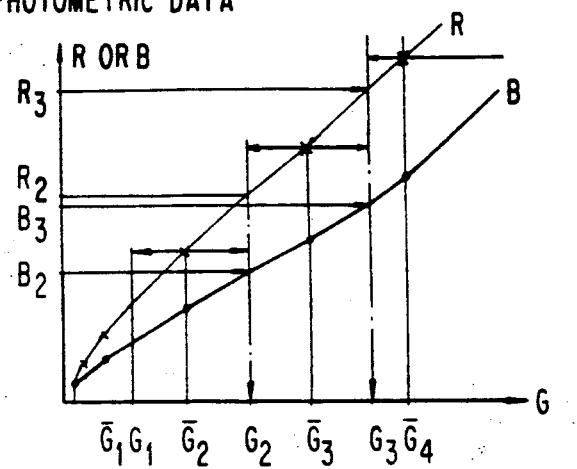
FIG. 11 is a chart illustrating normalization curves.

In an ensuing Step 106, the tricolor normalized photometric data is calculated by normalizing the corrected photometric data R, B by transforming the same into the density of G by using a normalization table shown in FIG. 11. The film density and the gradation balance vary depending on the type of film and development, so that when an identical object is photographed, the image density and color vary due to the type of film and development. The normalization processing is provided to obtain a fixed density and color on the negative film by correcting the same with respect to the identical object irrespective of the type of film and development. In addition, the normalization table is prepared on the basis of a curve indicating the relationship between an average value of the photometric data G and an average value of the photometric data R, as well as a curve indicating the relationship between an average value of the photometric data G and an average value of the photometric data B, all selected in Step 110 (which will be described below) and stored in the memory.

It should be noted that the normalization table is prepared by using stored data (a description will be given later with respect to the stored data) on an initial frame of one film, or stored data on a number of frames (a maximum of six frames) beginning with the initial frame. In cases where the normalization table is prepared by using the stored data on the initial frame, photometry and printing based on the normalization table thus prepared are effected consecutively for the second and ensuing frames. In cases where the normalization table is prepared by using the stored data on the number of frames, printing may be effected by changing the normalization table by consecutively conducting photometry and printing, and printing may alternatively be effected by returning to the initial frame after preparing the normalization table by conducting photometry on a number of frames. In the case of a film having a normal scene in its initial frame, it is preferable to prepare the normalization table by using the stored data on the initial frame. In addition, when the tricolor photometric data on an image frame has deviated by a predetermined value from the scope of image density of the initial frame (e.g., when it has deviated by 0.6 or more at a density difference $\Delta D$), the normalization table may be corrected at that point of time. Furthermore, the normalization table may be prepared by using both a small number of items of tricolor photometric data obtained from one film strip and stored data obtained from a multiplicity of film strips in the past.

The aforementioned corrected photometric data R, B are transformed into the density of G by using the above-described normalization table. As shown in FIG. 11, an average value $\bar{R}_3$ of the corrected photometric data R2 and R3 is transformed into an average value $\bar{G}_3$ of $G_2$ and $G_3$, and an average value $\bar{B}_3$ of corrected photometric data of $B_2$–$B_3$ is similarly transformed into an average value $\bar{G}_3$. At this time, the corrected photometric data G is used as it is without being transformed. As a method of this normalization, it is possible to use the methods disclosed in Japanese Patent Laid-Open Nos. 1039/1981 and 144158/1987 in addition to the above-described method.

Through such normalization of corrected photometric data, it is possible to use the same color coordinates even if the film density and the film type differ, and it is possible to set the origin of the coordinate at an arbitrary color. If it is assumed that an average value of the photometric data on a multiplicity of films becomes gray, the three colors of the normalized data on a gray object become identical by means of the above-described normalization. In practice, since the average value of the photometric data on a multiplicity of films is slightly different from gray, a correction is made by an amount corresponding to that difference.

The above-described normalization processing is conducted with respect to the sensitivity balance and the gradation balance, but is not restricted to the same. For instance, normalization may be effected with respect to one of the two items mentioned above.

Figure 12:
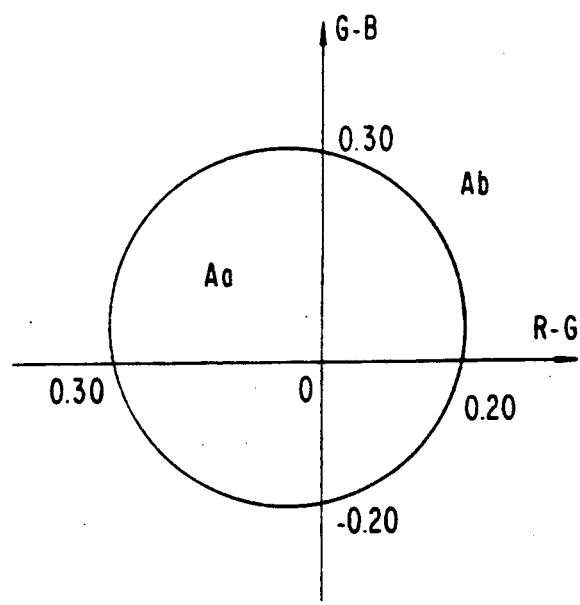
FIG. 12 is a chart illustrating color coordinates for classifying tricolor normalized data.

In an ensuing Step 108, as shown in FIG. 12, the tricolor normalized data is classified by determining to which color region the tricolor normalized data belongs, between a color region $A_a$ including the origin and a color region $A_b$ excluding the color region $A_a$, both regions being set on color coordinates with a difference, R - G, between the normalized data R and G taken as the abscissa and a difference, G - B, between the normalized data G and B taken as the ordinate. The tricolor normalized data is classified with a boundary between the color region $A_a$ and the color region $A_b$ serving as a point of demarcation, so that the tricolor normalized data is classified into data belonging to a region where the color difference from a reference value (origin) is small and into data belonging to a region where the color difference from the reference value is large.

The following table shows examples of a combination of the color regions, the tricolor normalized data classified for each of these color regions, and the tricolor photometric data corresponding to the tricolor normalized data.

TABLE

| Region | Photo-metric No. | Tricolor Photometric Data | | | Tricolor Normalized Data | | |
|---|---|---|---|---|---|---|---|
| | | R | G | B | R | G | B |
| Aa | 1 | 0.72 | 1.03 | 1.17 | 0.60 | 0.63 | 0.57 |
| Aa | 2 | 0.69 | 1.05 | 1.19 | 0.57 | 0.65 | 0.59 |
| Ab | 3 | 0.62 | 1.15 | 1.21 | 0.50 | 0.75 | 0.61 |
| Ab | 4 | 0.60 | 1.18 | 1.20 | 0.48 | 0.78 | 0.60 |
| — | — | — | — | — | — | — | — |
| — | — | — | — | — | — | — | — |
| — | — | — | — | — | — | — | — |

It should be noted that although in the above the tricolor normalized data is classified by using color coordinates using G - B and R - G as axes, it is possible to use as two- or three-dimensional color coordinates a coordinate axis having as its axis one color or a combination of two or more colors of the three primaries (e.g., Dx - Dy, Dx/Dy, Dx/(Dx+Dy+Dz), Dx+Dy+Dz, Dx/K, etc., where x, y, and z respectively represent a mutually different color from R, G, and B, and K is a constant), i.e., a coordinate axis having as its axis a color difference other than the above or a color ratio. In addition, a plurality of color regions may be determined in correspondence with a distance from a reference value. With this reference value, it is possible to adopt such as an origin of the color coordinates used, a value concerning a specific color of the original image, a value obtained from an average value of a multiplicity of images, a minimum value of photometric data, a value obtained from photometric data on a specific image, a predetermined specific constant, and so forth. Furthermore, the reference value may be a value given by a functional expression or a table. In this case, the functional expression or table may be such that a reference value changes depending on, for instance, an image density. It should be noted that a specific color of the original is a neutral color, a color of skin, or a color determined from an average value of a multiplicity of images.

Figure 13:
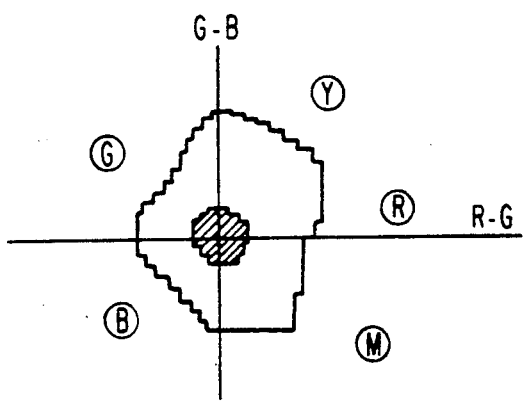
FIG. 13 is a chart illustrating other color coordinates for classifying tricolor normalized data.

In addition, regarding a color region, it is possible to use a color region in which a distance to its periphery from an origin provided on coordinates having a neutral color as an origin is irregular, as shown in FIG. 13.

In Step 110, the tricolor photometric data corresponding to the tricolor normalized data belonging to the color region $A_a$ in which a color difference from the reference value is small is selected and stored in the memory 34 to be used as stored data. In Step 112, the selected tricolor photometric data is averaged, and the first image data $MD_a$ is calculated. It should be noted that in cases where the tricolor normalized data is classified on the basis of coordinates having color ratios as axes, the tricolor photometric data corresponding to the tricolor normalized data belonging to a color region in which a color ratio from the reference value is small is selected, and this tricolor photometric data is averaged so as to calculate the first image data $MD_a$. A value in which the first image data is consecutively totalized may be used as the stored data. In addition, the stored data may be cleared for each film strip, while data on a multiplicity of frames may be stored as stored data.

Meanwhile, at the time of setting exposure conditions and at the time of manual printing, the number of items of tricolor photometric data selected is increased by expanding the scope of the color region $A_a$, or all the tricolor photometric data is used by suspending the selection of the photometric data.

Figure 14:
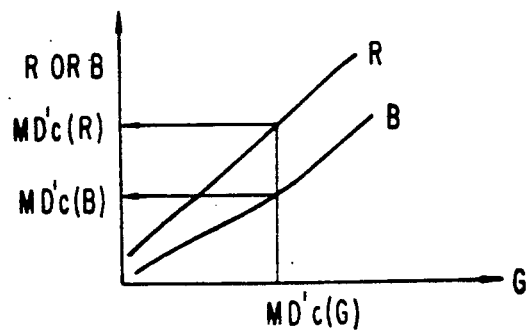
FIG. 14 is a diagram explaining a method for determining second image data.

In an ensuing Step 114, a second image data $MD_c$ corresponding to a specific color (e.g., a neutral color, or a color which is greater by a fixed color difference or by a fixed color ratio than a neutral color) is calculated. As this second image data $MD_c$, it is possible to use the tricolor photometric data corresponding to an origin of color coordinates shown in FIG. 12. If the density of G in the first image data $MD_a$ is assumed to be $MD'_c(G)$, this tricolor photometric data can be determined by the density of R, $MD'_c(R)$, and the density of B, $MD'_c(B)$, (FIG. 14) by inversely transforming this $MD'_c(G)$ by using the normalization table shown in FIG. 11, and then by adding the low-density-portion photometric data MIN (R), MIN (G), and MIN(B) to the densities of R, G, and B, $MD'_c(R)$, $MD'_c(G)$, and $MD'_c(B)$, respectively, as shown in the following Formula (2).

$$MDc(R) = MD'_c(R) + MIN(R)$$
$$MDc(G) = MD'_c(G) + MIN(G) \quad (2)$$
$$MDc(B) = MD'_c(B) + MIN(B)$$

Since the stored data obtained by consecutively totalizing the first image data corresponds to a specific color such as a neutral color, the second image data may be determined from the stored data.

Subsequently, in Step 116, an exposure control value $D_j$ is determined for a print negative in accordance with Formula (3) below, and in Step 118 an exposure amount $E_j$ is calculated in accordance with Formula (4) below. Incidentally, the subscript j indicates R, G, or B.

$$D_j = K_a MD_a + K_c MD_c \quad (3)$$

$$\log E_j = C_j S_j (D_j - D_{jON}) + F_j + d_j \quad (4)$$

where Ka and Kc are coefficients for weighting, and $K_a + K_c = $ a fixed value (e.g., 1.0); $C_j$ is a coefficient of color correction (=1.0); $S_j$ is a coefficient of slope control (=0.5−2.0); $D_{jON}$ is an exposure control value for a reference image of a reference film type; $F_j$ is a constant determined by the color paper and the color printer; and $d_j$ is an exposure correction value based on the content of an image.

The aforementioned weighting coefficients $K_a$, $K_c$ may be altered as shown below in correspondence with the following items (1) to (3) given below.

(1) At the time of setting exposure conditions $K_a = 0.7$ to $1.2$ $(0.9)$ $K_c = 0.5$ to $0.0$ $(0.1)$ (2) At the time of manual printing $K_a = 0.3$ to $0.9$ $(0.7)$ $K_c = 0.7$ to $0.1$ $(0.3)$ (3) At the time of automatic printing $K_a = 0.7$ to $1.2$ $(1.0)$ $K_c = 0.5$ to $0.0$ $(0.0)$ The figures in parentheses are ideal figures.

As described above, the scope of the color region $A_a$ is expanded at the time of setting exposure conditions or at the time of manual printing, or all the tricolor photometric data is used by suspending the selection of the photometric data. The reason for this as follows: As the coefficient $K_c$ becomes large, the correction of the film type and of an artificial light source deteriorates and the correction of a color failure improves, whereas as the coefficient Ka becomes large, the opposite to the above holds true. However, even if the value of the coefficient Ka is large as a result of the selection of the photometric data, color failure correction, film type correction, and artificial light source correction improve. Hence, since the color failure correction, light source correction, etc. are unnecessary at the time of setting exposure conditions and at the time of manual printing, there arises the need to weaken the effect of selection of photometric data so as to effect stabilization.

Figure 15:
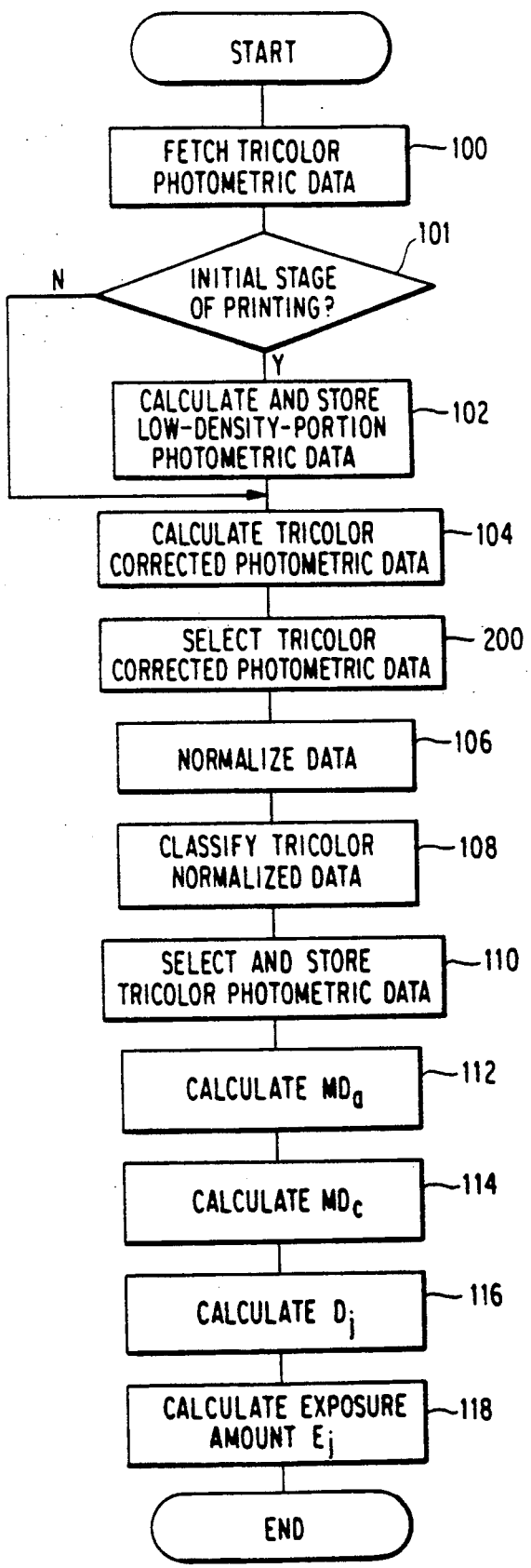
FIG. 15 is a flowchart illustrating a routine for calculating exposure amount in accordance with another embodiment of the present invention.

Referring now to FIG. 15, a description will be given of another embodiment of the present invention. In FIG. 15, those steps that are identical as those of FIG. 1 will be denoted by the same reference numerals, and a description thereof will be omitted. After the tricolor corrected photometric data is calculated in Step 104, the tricolor corrected photometric data is selected in Step 200, as follows: Namely, color differences RGHOSEI, GBHOSEI of average values of the photometric data on a reference film type of average values $D_{OR}$, $D_{OG}$, and $D_{OB}$ of the tricolor photometric data stored in the memory 34 as the stored data and selected in Step 110 are calculated in accordance with Formula (5) below. At the same time, color differences $D_{RG}$, $D_{GB}$ of tricolor corrected photometric data on an image frame to be printed are calculated in accordance with the following Formula (6):

$$\left.\begin{array}{l} RGHOSEI = D_{OR} - D_{OG} \\ GBHOSEI = D_{OG} - D_{OB} \end{array}\right\} \quad (5)$$

$$\left.\begin{array}{l} D_{RG} = D_R - D_G \\ D_{GB} = D_G - D_B \end{array}\right\} \quad (6)$$

Then, tricolor corrected photometric data satisfying the following Formula (7) is selected:

$$\left.\begin{array}{l} |D_{RG} - RGHOSEI| < KA \\ |D_{GB} - GBHOSEI| < KB \end{array}\right\} \quad (7)$$

where KA and KB are constants for selecting a range of selection.

It should be noted that the tricolor corrected photometric data may be selected by manually inputting a predetermined set value.

In accordance with this embodiment, the tricolor corrected photometric data is selected with rough accuracy in Step 200, and the tricolor photometric data is selected in correspondence with the classification of the tricolor corrected photometric data selected. Thus, since data is selected after roughly selecting the data, it is possible to obtain stored data with high accuracy, so that a normalization table with high accuracy can be obtained.

As can be appreciated from FIGS. 3, 5, 6 and 7, the color balance between R and G is substantially fixed in terms of the density, and the density of B becomes relatively higher than the density of G as the densities of G and B increase. Accordingly, in this case, it is necessary to ascertain to what extent a difference exists between the photometric data and the low-density-portion photometric data such as the mask density. An error of $\pm 0.3$ can be allowed for the density (e.g., density of G) if the color balance is allowed to vary by $\pm 0.05$ (since the image density of a gray object varies due to different photographing light sources, cameras, chronological changes of the film, characteristics between lots, etc., the normalization curve also has a margin of variation, so that this allowable error is set at $\pm 0.05$). Namely, if the error of the image density of the photometric data is within $\pm 0.3$, the color balance can estimated with an error of within $\pm 0.05$. As a result, it suffices if the low-density-portion photometric data is within $\pm 0.3$ with respect to the mask density or the mask density plus $\alpha$.

In the present invention, a predetermined comparative reference value is determined by normalizing photometric data without determining a comparative reference value for photometric data for each film strip. The conditions of this normalization (normalization table) can be obtained from stored data in which a multiplicity of items of image data collected from more than one film strip are stored. Hence, it is possible to accurately determine the conditions of normalization, with the result that highly accurate exposure control becomes possible.

It should be noted that although in the foregoing description the second image data is determined on the basis of an origin of coordinates shown in FIG. 12, the second image data may be determined on the basis of an average value of the tricolor photometric data on photometric points included in a neutral region shown by oblique lines in FIG. 13.

In addition, instead of the second image data $MD_c$, data $MD'c$ shown by the following formula may be used.

$$MD' = MD_c - K_j \quad \ldots \ldots \ldots \ldots \quad (8)$$

where $K_j$ is a correction value which is used not to cause a change in the printed color even if the values of $K_a$, $K_c$ are changed, and no change in color takes place when $MD'_c$ is equal to the average photometric data on each film type. In addition, $K_j$ may be altered depending on the density.

Furthermore, in cases where the low-density-portion photometric data is greater than a predetermined value (in the case of an over-exposed film), if the low-density-portion photometric data is corrected on the basis of a predetermined method without using the low-density-portion photometric data, or a predetermined value is used as the low-density-portion photometric data, correction may be effected by using, for instance, the following formula:

$$MIN'(j) = KX_j \cdot MIN(j) \quad \quad \quad (9)$$

(where $KX_j$ is a coefficient of $KX_j < 1.0$). The average-density-portion data on various types of film may be used as the predetermined values.

The present invention can similarly be utilized for digital color printers and image display units such as CRTs.

What is claimed is:

1. A method for determining exposure amount in an image copying apparatus, comprising the steps of:
    determining tricolor photometric data by dividing a color film with images recorded thereon into a plurality of segments and by photometrically measuring said segments;
    determining tricolor corrected photometric data by correcting said tricolor photometric data with photometric data on a low-density portion of the color film including a an image-recorded portion thereof;
    determining tricolor normalized data by normalizing said tricolor corrected photometric data by transforming said tricolor corrected photometric data in accordance with a predetermined condition of transformation;
    classifying said tricolor normalized data by comparing said tricolor normalized data with a reference value;
    selecting said tricolor photometric data in correspondence with the classification of said tricolor normalized data; and
    determining the exposure amount on the basis of an average value of said tricolor photometric data selected.

2. A method for determining exposure amount in an image copying apparatus according to claim 1, wherein said low-density-portion photometric data is set for each type of color film.

3. A method for determining exposure amount in an image copying apparatus according to claim 1, wherein said tricolor normalized data is classified by determining to which of a plurality of divided regions on a predetermined two- or three-dimensional coordinate said tricolor normalized data belongs.

4. A method for determining exposure amount in an image copying apparatus according to claim 1, wherein said low-density-portion photometric data is lowest-density data on said image recorded portion of the color film.

5. A method for determining exposure amount in an image copying apparatus according to claim 1, wherein said low-density-portion photometric data is lowest-density data outside of said image recorded portion of the color film.

6. A method for determining exposure amount in an image copying apparatus according to claim 1, wherein said low-density-portion photometric data is lowest-density data on a region straddling adjacent images recorded on the color film.

7. A method for determining exposure amount in an image copying apparatus, comprising the steps of:
    determining tricolor photometric data by dividing a color film with images recorded thereon into a plurality of segments and by photometrically measuring said segments;
    determining tricolor corrected photometric data by correcting said tricolor photometric data with photometric data on a low-density portion of the same color film including an image-recorded portion thereof;
    determining tricolor normalized data by normalizing said tricolor corrected photometric data by transforming said tricolor corrected photometric data in accordance with a predetermined condition of transformation;
    classifying said tricolor normalized data by determining to which of a plurality of divided regions on a predetermined coordinate said tricolor normalized data belongs;
    selecting said tricolor photometric data in correspondence with the classification of said tricolor normalized data and an operational mode of said image copying apparatus, wherein a weighted average value of the average value of said tricolor photometric data selected and of the tricolor data corresponding to said specific color on said coordinate is calculated by changing the weight in correspondence with the operational mode of said image coping apparatus, and the exposure amount is calculated on the basis of said weighted average value; and
    determining the exposure amount on the basis of an average value of said photometric selected and tricolor data corresponding to a specific color on said coordinate.

8. A method for determining exposure amount in an image copying apparatus according to claim 7, wherein when the operational mode of said image copying apparatus is at least an exposure condition setting mode, the selection is effected in such a manner that the number of items of tricolor photometric data is greater than when the operational mode of said image copying apparatus is in an automatic printing mode.

9. A method for determining exposure amount in an image copying apparatus according to claim 7, wherein said low-density-portion photometric data is lowest-density data on said image recorded portion of the color film.

10. A method for determining exposure amount in an image copying apparatus according to claim 7, wherein said low-density-portion photometric data is lowest-density data outside of said image recorded portion of the color film.

11. A method for determining exposure amount in an image copying apparatus according to claim 7, wherein said low-density-portion photometric data is lowest-density data on a region straddling adjacent images recorded on the color film.

12. A method for determining exposure amount in an image copying apparatus, comprising the steps of:
    determining tricolor photometric data by dividing a color film with images recorded thereon into a plurality of segments and by photometrically measuring said segments;

determining tricolor corrected photometric data by correcting said tricolor photometric data with photometric data on a low-density portion of the color film including an image-recorded portion thereof;

determining tricolor normalized data by normalizing said tricolor corrected photometric data by transforming said tricolor corrected photometric data in accordance with a condition of transformation set by storage data;

classifying said tricolor normalized data by determining to which of a plurality of divided regions on a predetermined coordinate said tricolor normalized data belongs;

selecting said tricolor photometric data in correspondence with the classification of said tricolor normalized data; and determining the exposure amount on the basis of an average value of said tricolor photometric data selected and storing necessary tricolor photometric data as said stored data;

wherein said necessary tricolor photometric data is equal to said tricolor photometric data which is selected by using the following steps:

selecting said tricolor corrected photometric data in accordance with a predetermined condition of selection;

determining tricolor normalized data selected, by normalizing said tricolor corrected photometric data selected, by transforming said tricolor corrected photometric data selected, in accordance with a condition of transformation set by same stored data;

classifying said tricolor normalized data selected, by determining to which of a plurality of divided regions on a predetermined coordinate said tricolor normalized data selected belongs; and selecting said tricolor photometric data in correspondence with the classification of said tricolor normalized data selected.

13. A method for determining exposure amount in an image copying apparatus, comprising the steps of:

determining tricolor photometric data by dividing a color film with images recorded thereon into a plurality of segments and by photometrically measuring said segments;

determining tricolor corrected photometric data by correcting said tricolor photometric data with photometric data on a low-density portion of the color film including an image-recorded portion thereof;

determining tricolor normalized data by normalizing said tricolor corrected photometric data by transforming said tricolor corrected photometric data in accordance with a condition of transformation set by storage data;

classifying said tricolor normalized data by determining to which of a plurality of divided regions on a predetermined coordinate said tricolor normalized data belongs;

selecting said tricolor photometric data in correspondence with the classification of said tricolor normalized data; and determining the exposure amount on the basis of an average value of said tricolor photometric data selected and storing necessary tricolor photometric data as said stored data;

wherein said necessary tricolor photometric data is said tricolor photometric data selected in correspondence with the classification of said tricolor normalized data.

14. A method for determining exposure amount in an image copying apparatus according to claim 12, wherein said predetermined condition of selection is set on the basis of an allowable value of said storage data.

15. A method for determining exposure amount in an image copying apparatus according to claim 12, wherein the exposure amount is determined on the basis of the average value of said tricolor photometric data selected and tricolor data corresponding to a specific color on said coordinate.

16. A method for determining exposure amount in an image copying apparatus according to claim 15, wherein said tricolor data is set on the basis of said stored data.

17. A method for determining exposure amount in an image copying apparatus according to claim 13, wherein the exposure amount is determined on the basis of the average value of said tricolor photometric data selected and tricolor data corresponding to a specific color on said coordinate.

18. A method for determining exposure amount in an image copying apparatus according to claim 17, wherein said tricolor data is set on the basis of said stored data.

* * * * *